US011468617B2

(12) United States Patent
Pinel et al.

(10) Patent No.: US 11,468,617 B2
(45) Date of Patent: Oct. 11, 2022

(54) SELECTIVE REDACTION OF IMAGES

(71) Applicant: International Business Machines Corporation, Armonk, NY (US)

(72) Inventors: Florian Pinel, New York, NY (US); Peter Alan Coldicott, Jonestown, TX (US); Frank Yeh, Jr., Santa Ana, CA (US); Russell Patrick Bobbitt, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/197,115

(22) Filed: Mar. 10, 2021

(65) Prior Publication Data

US 2022/0292750 A1   Sep. 15, 2022

(51) Int. Cl.
*G06T 13/40* (2011.01)
*G06N 20/00* (2019.01)

(52) U.S. Cl.
CPC ............. *G06T 13/40* (2013.01); *G06N 20/00* (2019.01)

(58) Field of Classification Search
None
See application file for complete search history.

(56) References Cited

U.S. PATENT DOCUMENTS 9,514,374 B2    12/2016  Artan
11,164,046 B1*  11/2021  Kim ................... G06V 10/7515
11,200,494 B1*  12/2021  Kim ................... G06F 21/6254
2007/0294305 A1 12/2007  Cohen
2009/0262987 A1 10/2009  Ioffe
2014/0342331 A1 11/2014  Freeman
2019/0348076 A1 11/2019  Hershfield
2020/0143838 A1  5/2020  Peleg
2021/0034783 A1* 2/2021  Blumhofer ............. G16H 30/40

FOREIGN PATENT DOCUMENTS

| CN | 105354411 A | 2/2016 |
| CN | 109508620 A | 3/2019 |
| CN | 111680672 A | 9/2020 |
| JP | 2013226286 A | 11/2013 |

(Continued)

OTHER PUBLICATIONS

"Chrome Web Store", Google, downloaded from the WayBack Machine Internet Archive on Jan. 21, 2021, 1 page, <https://chrome.google.com/webstore/detail/avatar-creator/ebpgjnehgpomhonmilogodhlnacgejho/related>.

(Continued)

*Primary Examiner* — Nurun Flora
(74) *Attorney, Agent, or Firm* — David K. Mattheis; Maeve M. Carpenter

(57) ABSTRACT

Selectively redacting an image by determining a set of attributes used by a machine learning model for an analysis, receiving image data detecting, by the one or more computer processors, a portion of the image data relevant to the analysis, the portion comprising at least some of the set of attributes, generating a synthetic portion from the portion, wherein the synthetic portion retains at least some of the attributes of the detected portion, replacing the portion with the synthetic portion, yielding redacted image data, and providing the redacted image data for analysis.

20 Claims, 6 Drawing Sheets

(56) References Cited

FOREIGN PATENT DOCUMENTS

| KR | 20140087092 A | 7/2014 |
|---|---|---|
| WO | 2019050508 A1 | 3/2019 |

OTHER PUBLICATIONS

"CS231n Convolutional Neural Networks for Visual Recognition", downloaded from the Internet on Jan. 20, 2021, 7 pages, <https://cs231n.github.io/understanding-cnn/>.

"How to Create an Avatar From Photo? Step by Step Guide", ZMOJI, downloaded from the Internet on Jan. 20, 2021, 17 pages, <https://www.zmoji.me/5-steps-to-easily-create-stunning-avatar-from-photo/>.

"Photo to Cartoon | Cartoonize Yourself", kusoCartoon, downloaded from the Internet on Jan. 20, 2021, 3 pages, <https://kusocartoon.com/>.

"Visualizing and explaining neural networks", provided in invention Aug. 24, 2020, downloaded from the Internet on Jan. 20, 2021, 44 pages, <https://slazebni.cs.illinois.edu/fall18/lec11_visualization.pdf>.

Butler et al., "The Privacy-Utility Tradeoff for Remotely Teleoperated Robots", HRI '15, Mar. 2-5, 2015, Portland, OR, USA, 8 pages, http://dx.doi.org/10.1145/2696454.2696484.

Du et al., "GARP-Face: Balancing Privacy Protection and Utility Preservation in Face De-identification", IEEE International Joint Conference on Biometrics, Clearwater, FL, 2014, 8 pages.

Jourabloo et al., "Attribute Preserved Face De-identification", 2015 International Conference on Biometrics (ICB), pp. 278-285.

Kim et al., "Privacy-Preserving Robot Vision with Anonymized Faces by Extreme Low Resolution", 2019 IEEE/RSJ International Conference on Intelligent Robots and Systems (IROS), Macau, China, Nov. 4-8, 2019, pp. 462-467.

Kuehl et al., ""Healthy surveillance": Designing a concept for privacy-preserving mask recognition AI in the age of pandemics", KIT Working Paper, Version Jun. 28, 2020, 10 pages.

Lee et al., "Privacy-Protection Drone Patrol System based on Face Anonymization", arXiv:2005.14390v1 [cs.CV] May 29, 2020, 16 pages.

Matcha, Anil Chandra Naidu, "Class activation maps: Visualizing neural network decision-making", Heartbeat, Oct. 28, 2019, 17 pages.

Mell et al., "The NIST Definition of Cloud Computing", Recommendations of the National Institute of Standards and Technology, Special Publication 800-145, Sep. 2011, 7 pages.

Ren et al., "Learning to Anonymize Faces for Privacy Preserving Action Detection," in proceedings of the European Conference on Computer Vision (ECCV) 2018, 17 pages.

Sah et al., "Video redaction: a survey and comparison of enabling technologies", Journal of Electronic Imaging, 26(5), 051406, (Sep./Oct. 2017), 15 pages, doi: 10.1117/1.JEI.26.5.051406.

Yosinski et al., "Understanding Neural Networks Through Deep Visualization", downloaded from the Internet on Jan. 20, 2021, 12 pages, <http://yosinski.com/deepvis>.

Zeiler et al., "Visualizing and Understanding Convolutional Networks", arXiv:1311.2901v3 [cs.CV] Nov. 28, 2013, pp. 1-4.

Zeiler et al., "Visualizing and Understanding Convolutional Networks", arXiv:1311.2901v3 [cs.CV] Nov. 28, 2013, pp. 5-11.

International Search Report and Written Opinion dated Apr. 25, 2022 from International Application No. PCT/CH2022/076327 filed Feb. 15, 2022.

\* cited by examiner

SELECTIVE REDACTION OF IMAGES

BACKGROUND

The disclosure relates generally to the analysis and selective redaction of images. The disclosure relates particularly to detecting and selectively redacting faces in images.

Data and privacy protection regulations discourage the transmission of video or still images which include identifiable human faces and encourage the blurring of any faces contained in the images. Video analytics software enables the detection and obfuscation of faces by pixilating portions of the image, or otherwise blurring the detected face. Pixilation or blurring render the detected faces completely unrecognizable as faces. As a result, the output of such video analytics software cannot be analyzed with regard to faces for any purpose as all included faces have been rendered unrecognizable as faces. Similarly, analysis software specific to detecting vehicle license plates for state and county information, identification badges for company affiliation, may be defeated by the complete obfuscation of license plates prior to any such analysis.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable the selective redaction of detected facial images.

Aspects of the invention disclose methods, systems and computer readable media associated with selectively redacting an image by determining a set of attributes used by a machine learning model for an analysis, receiving image data detecting, by the one or more computer processors, a portion of the image data relevant to the analysis, the portion comprising at least some of the set of attributes, generating a synthetic portion from the portion, wherein the synthetic portion retains at least some of the attributes of the detected portion, replacing the portion with the synthetic portion, yielding redacted image data, and providing the redacted image data for analysis.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
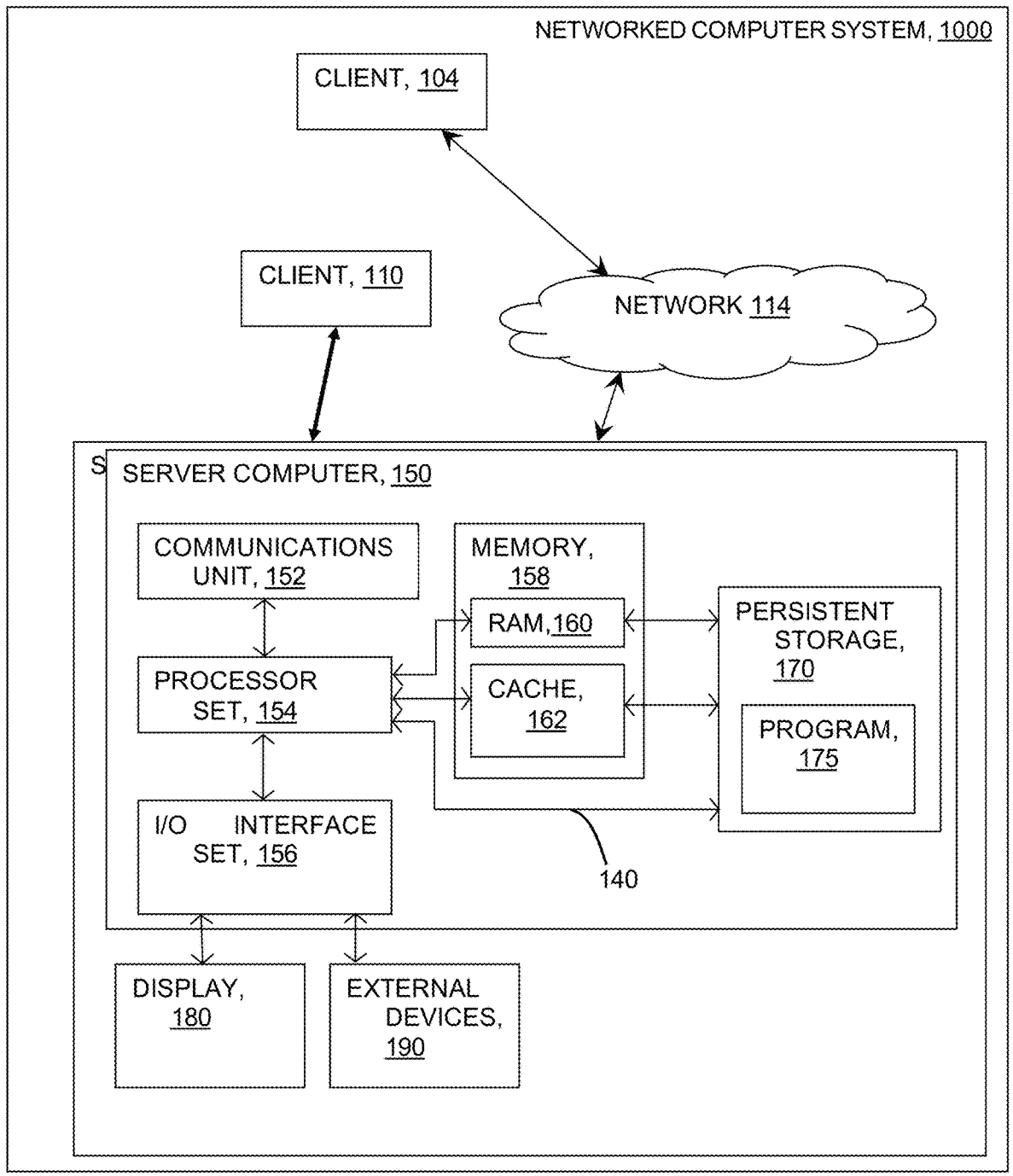
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Data regulations discourage the use of images or video streams which include recognizable facial images to protect the privacy of individuals. As an example, video analysis software directed toward uses including the detection of face masks, broad demographic analysis and fever detection using an IR camera, require images recognizable as a face, but not recognizable to the extent of identifying an individual. Typical redaction systems pixilate or otherwise entirely blur the detected faces of an image such that the former faces are no longer identifiable, but the former faces are also no longer detectable as faces. Analysis for information related to a face but without a need for an identifiable face cannot proceed. Similarly, traffic analysis software may require an ability to detect different vehicle types but may not require an ability to identify or read vehicle license plate information. Disclosed systems and methods enable video and still images including detectable but unidentifiable image portions, such as facial image portions in image data. Disclosed methods and systems redact identifiable image portions while retaining sufficient image attribute to enable the use of downstream analysis models but with insufficient attributes to enable identification of the relevant image content.

In an embodiment, one or more components of the system can employ hardware and/or software to solve problems that are highly technical in nature (e.g., determining a set of attributes used by a machine learning model for analysis, receiving image data, detecting a portion of the image data relevant to the analysis, generating a synthetic portion from the detected portion, where the synthetic portion retains the set of attributes of the detected portion, replacing the detected portion with the synthetic portion, yielding redacted image data, providing the redacted image data for analysis, etc.). These solutions are not abstract and cannot be performed as a set of mental acts by a human due to the processing capabilities needed to facilitate face detection without identification, for example. Further, some of the processes performed may be performed by a specialized computer for carrying out defined tasks related to selectively redacting image data. For example, a specialized computer can be employed to carry out tasks related to providing detectable but unidentifiable image portions, or the like.

Video analysis software includes machine learning models trained to make inferences and to detect particular portions of the frames of a video stream, or portions of a still image. These models may be trained to detect animals, faces, street signs, cross walks, buses, cars, bicycles, or other objects of interest. The models include weighted attributes associated with the appearance of the object of interest in the image. The appearance attributes may include shape of the entire object as well as portions of the object, the appearance of the object from a multitude of angles, coloration patterns associated with the type of object, contextual patterns associated with the object. Smart redaction methods enable identification of an organization from an individual's identification badge without concurrent identification of the individual from the badge. Selective redaction of brand imagery from ads enables identifying the ad and product type without identifying the actual brand being advertised. Detection of scene elements, including traffic signs, vehicles, and people without the identification of those people or vehicles.

Applications of disclosed embodiments include smart redaction of license plates, enabling recognition of state and county information but not the complete license plate number. Tacking an individual or vehicle across multiple camera views without enabling identification of the person or vehicle. Disclosed embodiments enable the classification of documents after such documents have been anonymized by the smart redaction of personal information.

In an embodiment, a system includes a deep learning model analyzer configured to analyze downstream analysis models and to determine the essential attributes needed for successful downstream image analysis. In this embodiment, the analyzer utilizes a validation data set, either a stand-alone data set, or the active real-time image set, such as a video stream. The system further comprises a smart redaction system which analyzes input image data and outputs redacted image data where the redacted output image data includes redacted image portions which cannot be identified but can be detected by the downstream image analysis models.

The system may be configured with the portion detector and smart redactor residing on a smart camera or on edge cloud resources, the smart redaction occurring as part of the camera image processing, and the deep learning model analyzer residing on cloud resources or on a central server where the downstream deep learning image analysis model resides. In such a configuration, the deep learning model on the central server receives redacted image data from the cloud or edge cloud resources for further downstream analysis, such as the detection of face masks. The allocation of system components across a computing environment is not critical to the operation of the system as a whole. Different portions may reside on local devices, edge cloud and cloud resource and the central server. The disclosed system as a whole acquires image data, redacts the image data according to the essential attribute needs of the downstream deep-learning model, and redacts the image data to output redacted data which includes the essential attributes but which no longer enables identification of individuals or other objects.

As an example, a face detector and smart redactor run on edge cloud resources connected to one or more cameras. The remaining system components run on a central server which receives redacted image data from the edge cloud resources. System components may be implemented as hardware or firmware to improve performance and prevent tampering with the components.

The following description focuses on the use of disclosed embodiments to redact faces in image data. The example of face image redaction should not be construed as limiting the scope of the invention. In an embodiment, the method utilizes a validation data set including annotated image data. The validation data set may be the training data set used to train the deep-learning model—in this embodiment a face detection model. The validation data set may be the output acquired by applying the trained deep-learning face detection model to an incoming video stream from one or more system cameras. The validation data set may be the annotated output of the deep-learning model for a separately sourced video data stream. The validation data set includes objects detected using the trained deep-learning model.

In an embodiment, the method proceeds by generating an avatar, or stylized version of the detected object, associated with each detected object (e.g., face) of the validation data set. The generated avatar may bear a passing resemblance to the underlying detected object but not resemble the object to an extent needed to identify an individual subject. For example, the avatar may be recognizable as a human face but not identifiable as a particular face or individual. Exemplary avatar generation methods include the use of a face generator trained to generate an avatar upon receiving a facial image, a generator trained to generate an avatar upon receiving image attributes associated with an (e.g., facial) image, such as face shape, hair color, etc. In an embodiment, the method generates an avatar by comparing the detected object to a set of possible avatars for the object and selecting the possible avatar having the closest degree of comparison. For example, each of the underlying object and possible avatars may be expressed as a vector and the comparison includes determining the possible avatar having the closest vector value to that of the underlying detected object. In an embodiment, the method uses the same single stylized representation of the class of possible detected objects for each detected object. The generated avatar may be 2-dimensional or 3 dimensional.

In an embodiment, after generating avatars according to the members of the validation data set, the method applies an overlay to each avatar and each corresponding validation data set member. In this embodiment, the overlay includes one or more cells, such as an N×M grid of rectangular cells of equal size which cover the avatar and validation set member respectively. In an embodiment, the cells have different sizes and shapes and relate to the contours and contrast regions of the underlying detected object. In an embodiment, the method anchors cells to object landmarks, eyes, nose, mouth. In an embodiment, the cells do not cover the entire avatar or underlying object. In an embodiment, the overlay comprises a single cell covering most or all of the avatar and underlying object. In an embodiment, the method utilizes a single avatar generator and a single overlay or multiple image overlay protocols. In an embodiment, the method uses multiple avatar generators in combination with multiple overlays to generate pairing of overlaid avatars and underlying detected objects.

In an embodiment, the method applies object detection to the elements of the validation data set. For example, the method applies face detection analysis to a validation data set of facial images. Face detection, as used herein, refers to analysis of images or video for the purpose of detecting portions corresponding to a human face, in contrast to facial recognition which analyzes image an video data for the purpose of identifying a n individual from the data. Where facial detection may identify a portion of an image as a human face, facial recognition identifies that portion as the face of a named individual. The face detection analysis returns attributes such as bounding boxes, face landmarks, pose estimation, and other face attributes for each member of the validation data set. For each member of the data set, the method then generates an avatar utilizing one or more avatar generators. In an embodiment, the method uses the face attributes such as face landmarks and pose estimation to adjust or distort the generated avatar making the now distorted avatar more similar to the underlying detected facial image. The method then applies the same image overlay to each of the underlying facial image and the avatar. The method then generates one or more synthetic images by substituting overlay cells from the avatar with the corresponding overlay cells of the underlying image. In an embodiment, the method overlays avatar overlay cells upon corresponding underlying image overlay cells with a full opacity or utilizing an opacity ratio between the avatar and underlying image cells, for the avatar cells. In an embodiment, the method generates a set of synthetic images for each avatar-underlying image pair. In this embodiment, the set comprises images having different sets of avatar cells substituted for, or overlaid upon, the corresponding underlying image cells. As an example, for an overlay grid of 3×3 cells with a synthetic transformation consisting of replacing one or more cells from the avatar to the underlying image, the complete set of possible synthetic images includes $2^{(3*3)}$, or 512 unique synthetic images. For a 10×10 overlay grid, the full set of synthetic images includes approximately $10^{30}$ synthetic images.

In an embodiment, the method utilizes the set of synthetic images described above to analyze the deep-learning image analysis model to determine the attributes used by the model and to determine one or more sets of sufficient attributes for detection of the desired objects. In this embodiment, the method selects synthetic images and corresponding underlying images from the set, the selection may be made using a grid search of the set, a random search of the set the sequential selection of every image in the set of other selection methods. In an embodiment, the method selects a validation set image and selects a possible synthetic image transformation and generates the synthetic image according to the transformation yielding the underlying image and synthetic image pair. For each synthetic image/underlying image pair selected, the method applies the deep learning model image analytics software and deep learning model classifier to each image of the pair. The method compares the deep-learning model prediction for each of the two images. The method determines an accuracy score for each transformation associated with the set of selected image pairs embodying the selected set of synthetic image transformations. The method determines the accuracy score as the number of correct predictions for synthetic images generated using the transformation, divided by the number of correct predictions for the underlying images. Higher accuracy indicates that the associated synthetic image transformation yields a synthetic image having sufficient attributes to be detectable by the deep-learning model. In this embodiment, the method records the synthetic transformations having the highest accuracy scores.

In an embodiment, the method identifies and filters out accurate synthetic transformations which yield detectable image portions which retain too many underlying image attributes, such as transformations which yield detectable faces which can also be identified. In this embodiment, transformations yielding synthetic images wherein less than a threshold level of the underlying image has been replaced by portions of the avatar, may be filtered out or otherwise excluded from further consideration. In this embodiment, the method applies appropriate object recognition analysis, such as facial recognition analysis, to the synthetic images and associated underlying images and compares the facial recognition results, such as facial recognition feature vectors, for each of the synthetic and underlying images. Transformations having similarity metrics below a threshold, indicating a high degree of similarity between the synthetic image and underlying image features vectors, are filtered from the set of synthetic image transformations. Such transformations yield synthetic image portions which retain sufficient attributes to enable recognition in addition to detection of the image portions. In this embodiment, the method selects the highest accuracy synthetic image transformations from the remaining set of transformations. Such selected transformations yield synthetic image portions which are detectable by the downstream machine learning model, but which lack sufficient attributes to enable recognition beyond simple detection of the image portion.

In an embodiment, the method utilizes one or more of the selected high-accuracy synthetic image transformations for use in the selective redacting of image data. In this embodiment, the method receives image data, the method applies the appropriate deep-learning analysis model to the image data, detecting objects appropriate for the model, such as faces. The method then applies the selected synthetic image transformations to the detected image portions yielding redacted, synthetic images from the underlying images. In an embodiment, the method then replaces the underlying images with the redacted, synthetic images and provides the now redacted image data as an output, either as a redacted still image, or as a redacted video stream.

In an embodiment, the method determines a set of attributes sufficient to enable image portion detection by the downstream machine learning model. The method embodies this set of attributes as a set of one or more synthetic image generating transforms. The method analyzes the set of transforms to identify those transforms which yield synthetic images no longer identifiable as the original, underlying image portion. These identified transforms are then passed to a smart redactor for use in redacting incoming image data, yielding data retaining detectable features which are no longer identifiable as the original.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise image data redaction program (not shown) together with sufficient computing resource (processor, memory, network communications hardware) to execute the program. Client devices 104 and 110 may comprise cameras, user interface devices such as smart phones, tablets, or personal computers, or edge cloud processing devices. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the image data processing program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., image data processing program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
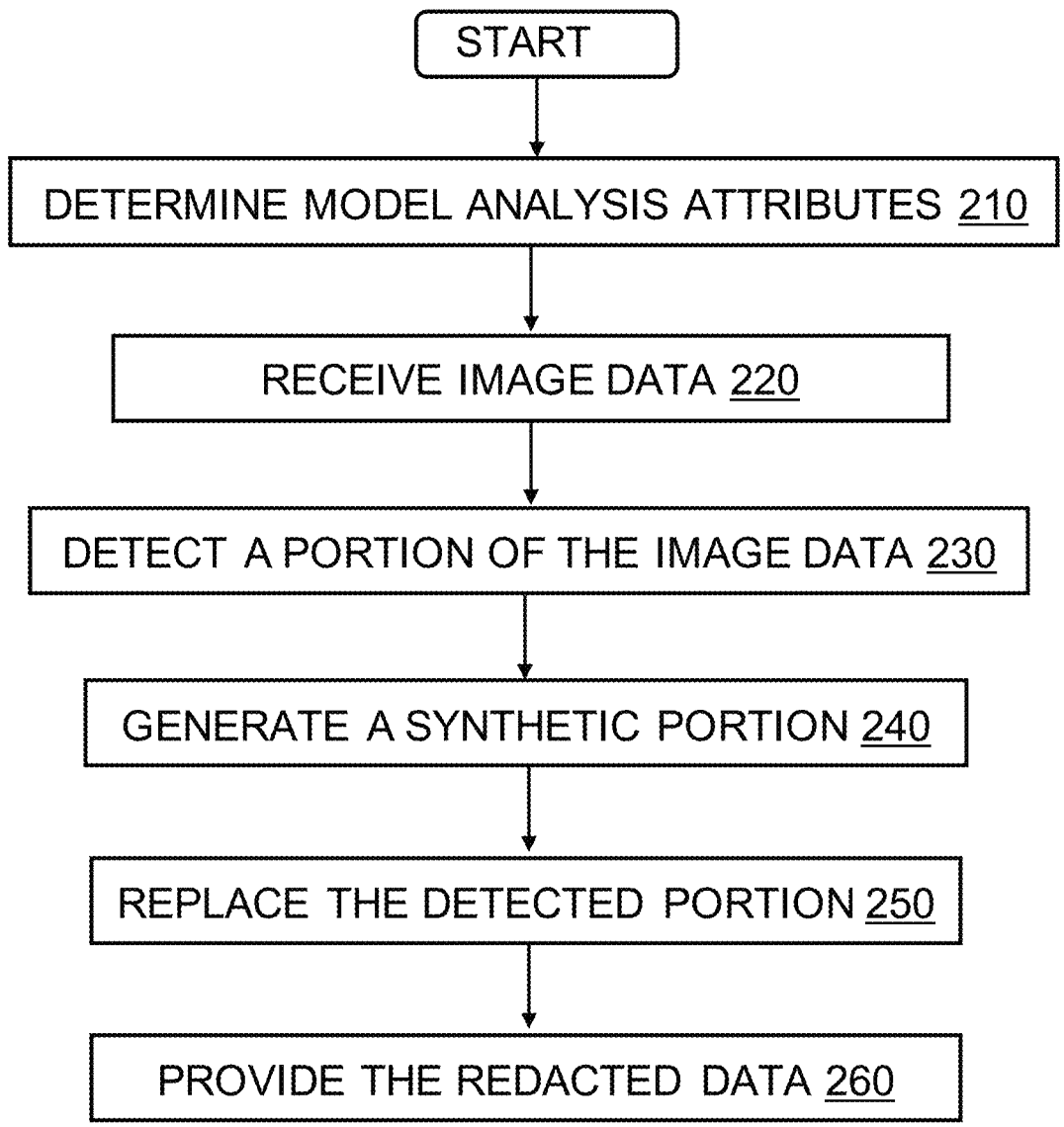
FIG. 2 provides a flowchart depicting an operational sequence, according to an embodiment of the invention.

FIG. 2 provides a flowchart 200, illustrating exemplary activities associated with the practice of the disclosure. After program start, block 210, the method determines the attributes used by a machine learning model for analysis. In an embodiment, the method processes a validation set of data, or live streamed data using the downstream machine learning model to detect portions of interest to the model for analysis. For each detected portion the model generates one or more synthetic images using a single transformation or a set of image transformations. The method then evaluates the transformation(s) to identify those transformation which yield image portions that are detectable by the downstream model, but which no longer include sufficient attributes to be recognizable as the underlying subject. For example, the method identifies those transformations which yield synthetic image portions still detectable as human faces while no longer being recognizable as the faces of the underlying human subjects. The method selects the highest accuracy transformation—those yielding the highest ratio of synthetic image detection to underlying image detection. The selected transformations embody the analysis attributes of the downstream machine learning model.

At block 220, the method receives image data in the form of still or video images from one or more cameras. The received image data includes image portions detectable through image analysis by the downstream machine learning model.

At block 230, the method applies the downstream machine learning model to the image data to detect the image portions of interest to the model. At block 240, the method generates synthetic image portions corresponding to the detected image portions. In an embodiment, the method generates an avatar for each detected image portion and applies a transformation to the underlying detected portion-avatar pair to generate a synthetic image portion as a transformed combination of the two image portions. In this embodiment, the avatar may be modified according to attributes such as facial landmarks or pose estimation from the underlying image to make the synthetic more similar to the underlying image.

At block 250 the method redacts the original image data, replacing the detected portions with the synthetic portions generated using one or more transformations as described above. The redaction yields an image data stream which may be provided to and analyzed by the downstream machine learning model to detect the now redacted image portions for further analysis at block 260, without risk of privacy issues due to recognition analysis of the detected portions.

Figure 3:
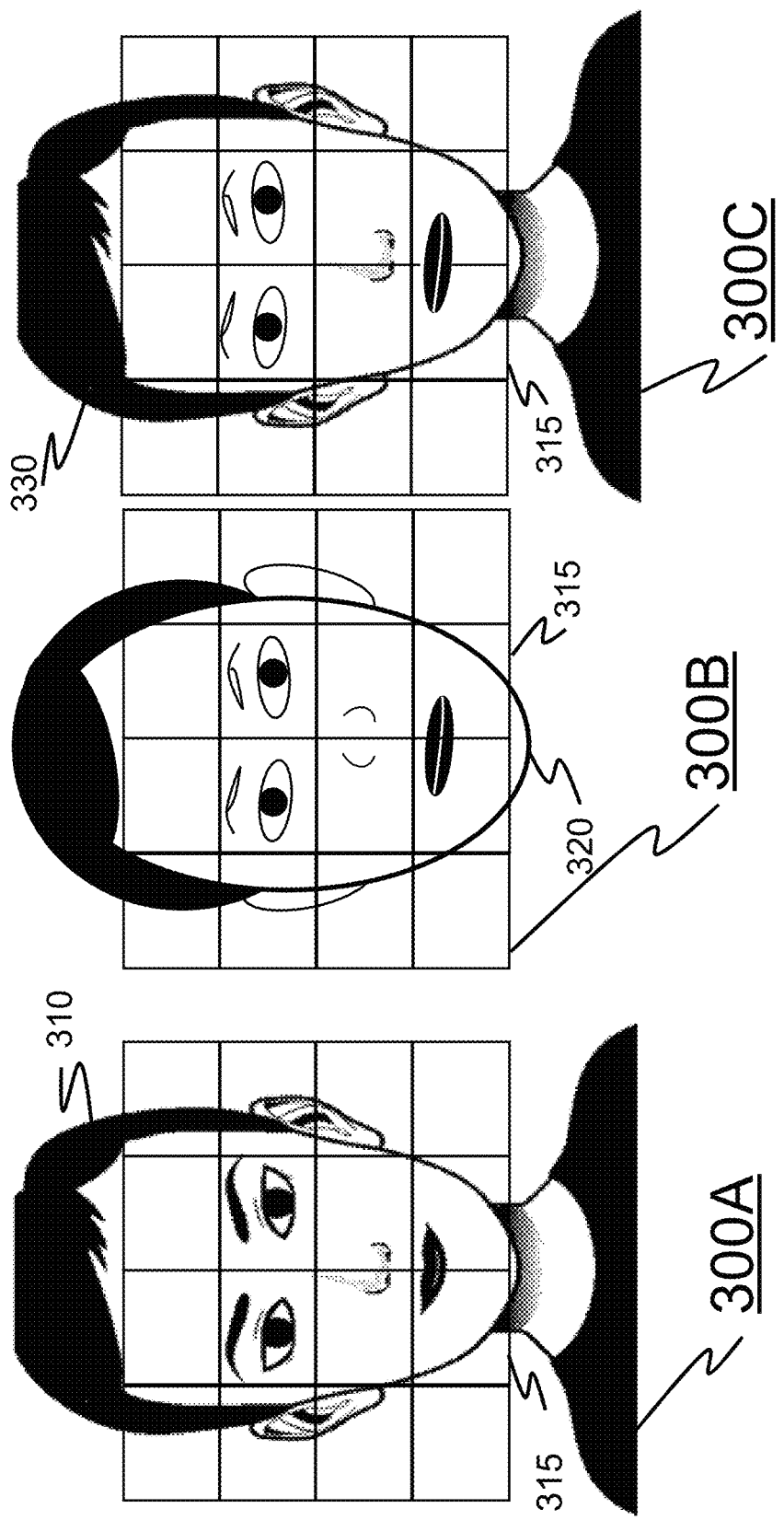
FIG. 3 depicts generation of a synthetic image, according to an embodiment of the invention.

FIG. 3 provides a series of schematic illustrations showing the steps of generating a synthetic image from an underlying detected image portion using an avatar image and a transformation. 300A illustrates an underlying detected portion extracted from the received image data. The underlying detected portion includes a human face image portion 310. 300B illustrates an avatar 320, generated using attributed extracted from the detected portion of 300A. 300A and 300B illustrate each of the human face image portion 310 of 300A, and avatar 320 of 300B, after the application of an image overlay 315. Image overlay 315 including a plurality of cells covering all or part of face image portion 310, avatar 320, and synthetic image portion 330. 300C illustrates the synthetic image portion 330 generated using a transformation to substitute portions of avatar 320 for corresponding portions of human face image portion 310.

Figure 4:
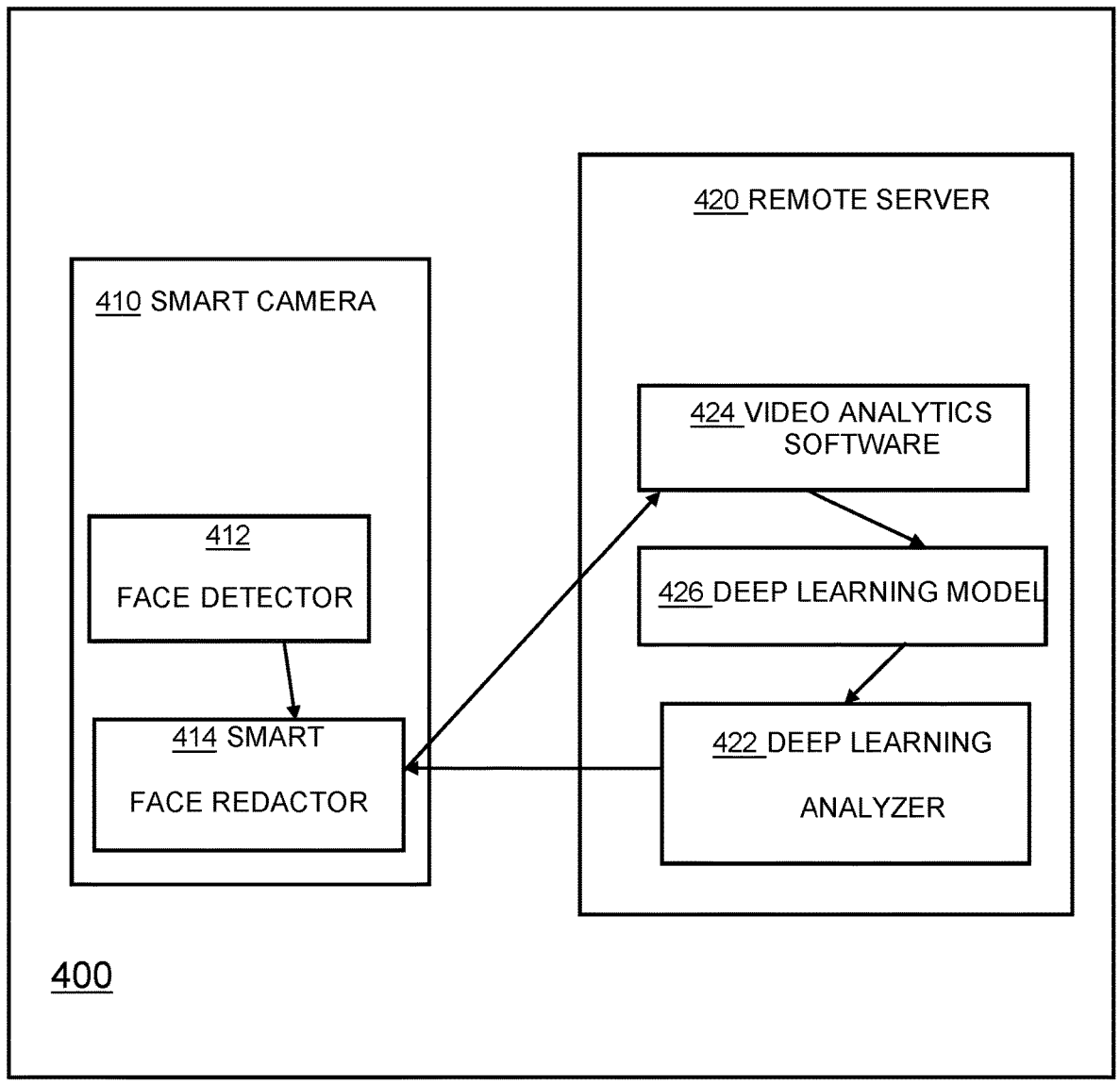
FIG. 4 depicts a system architecture, according to an embodiment of the invention.

FIG. 4 provides a schematic illustration 400 of a system architecture, according to an embodiment of the invention. As shown in the Figure, smart camera 410, includes face detector 412, and smart face redactor 414. Face detector 412, and smart face redactor 414, may comprise hardware or software components of the smart camera 410. As shown in the Figure, smart face redactor 414, communicated with the downstream deep-learning analyzer 422, resident upon a remote server 420. Smart face redactor 414 passes detected portions such as face, to the deep-learning video analytics software 424 and deep learning model 426 to determine the essential or sufficient attributes used by the deep-learning model 426 Smart face redactor 414 further communicates with deep learning analyzer 422, also resident upon remote server 420, to receive the determined attributes of the deep learning model 426.

Video analytics software 424 receives redacted image data from smart redactor 414 for analysis, such as for detection of face masks etc. Each of video analytics software 424, and deep learning analyzer 422, are in communication with and utilize deep-learning model 426 for the detection and further analysis of image data. Video analytics software 424, passes its detected portions output to the deep learning model for further analysis and classification. Deep learning analyzer 422 analyzes the processing and classification of original and synthetic image pairs by the deep learning model 426, to determine the attributes used by the deep learning model 426 and passes the determined attributes to the smart redactor 414.

In an embodiment, smart face redactor 414 receives one or more image data transforms from deep learning analyzer 422. In this embodiment, the image data transforms are applied to underlying image portions and avatar images to generate synthetic image data through the selective replacement of underlying image data with avatar data.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
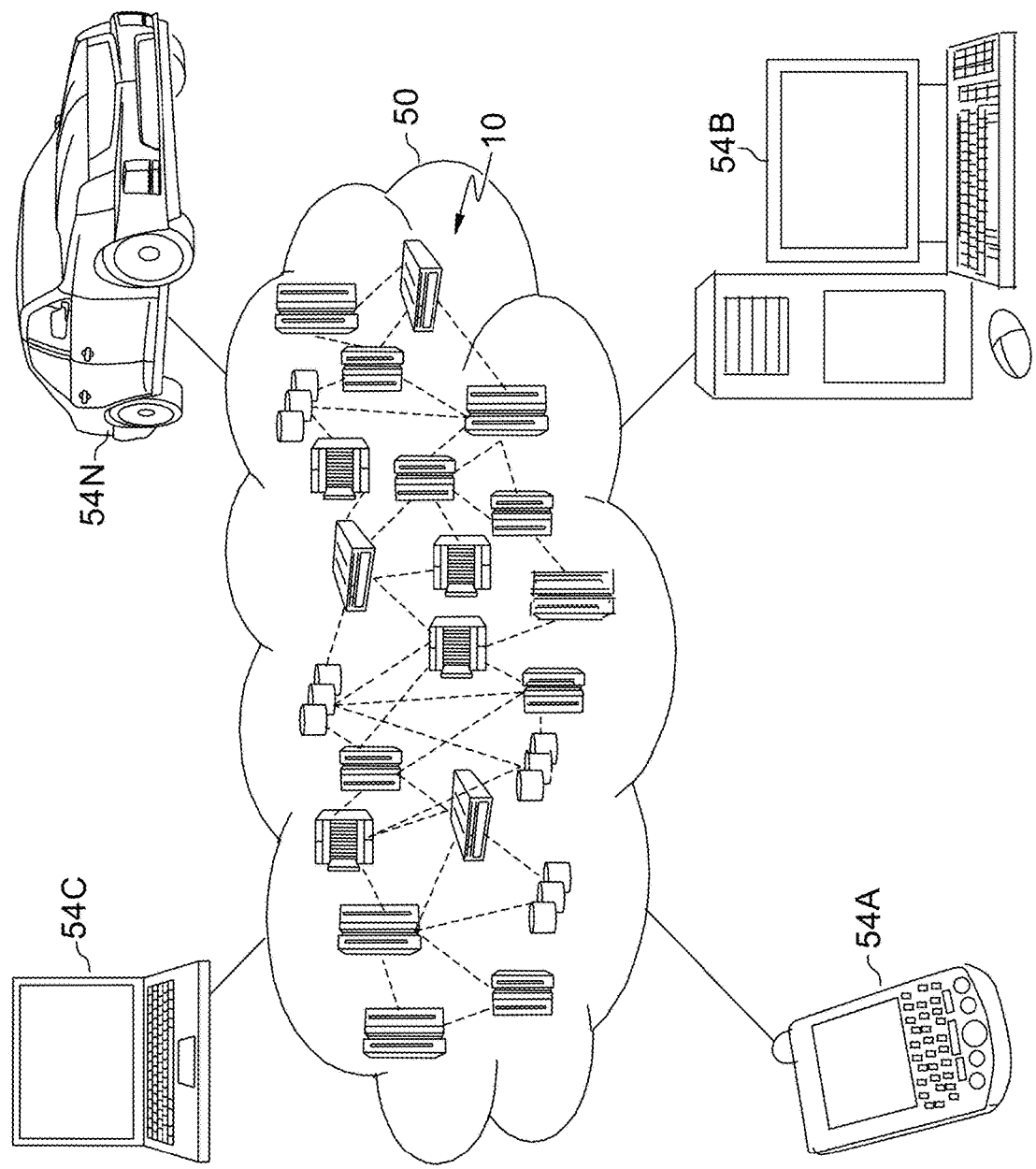
FIG. 5 depicts a cloud computing environment, according to an embodiment of the invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 6:
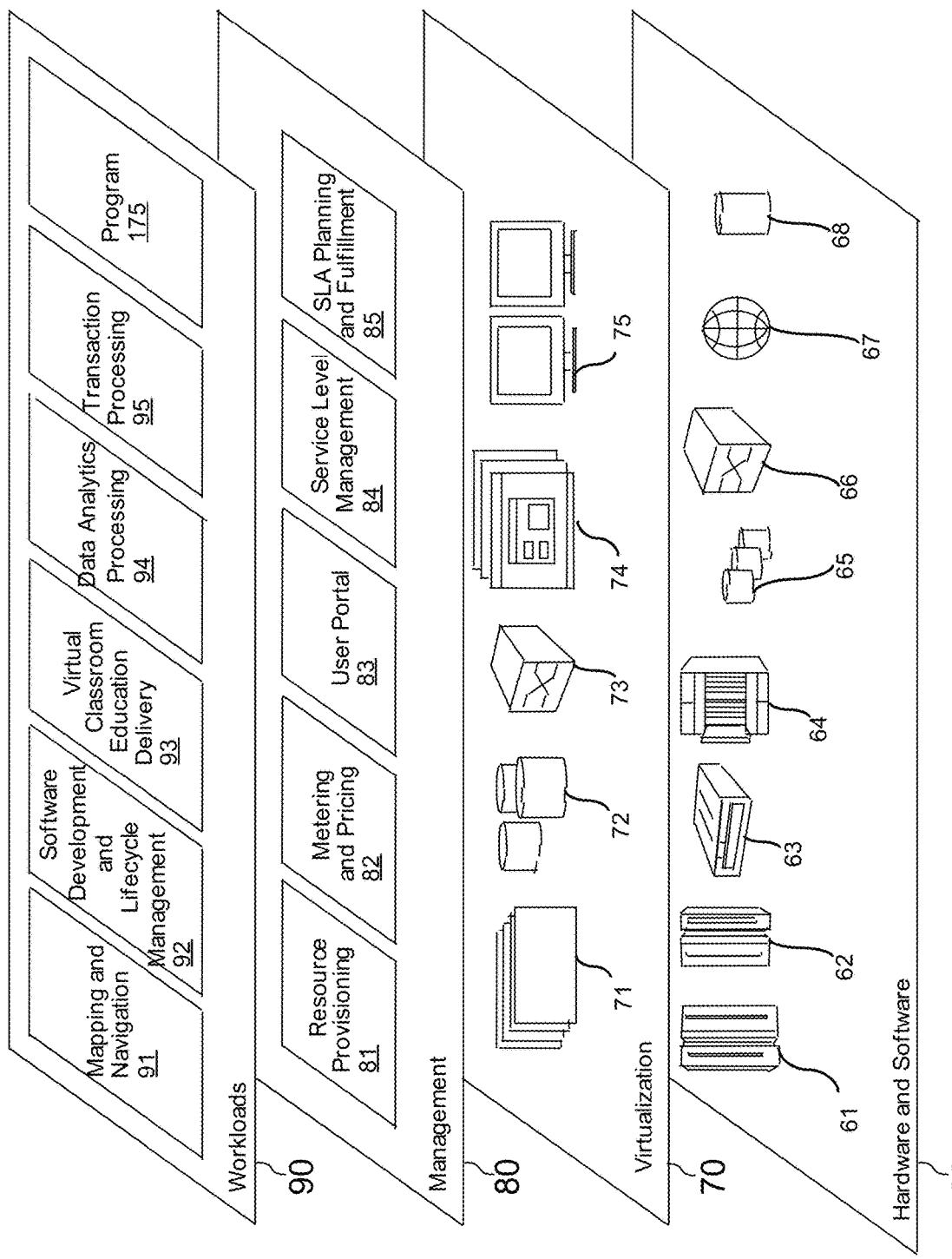
FIG. 6 depicts abstraction model layers, according to an embodiment of the invention.

Referring now to FIG. 6, a set of functional abstraction layers provided by cloud computing environment 50 (FIG. 3) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image data processing program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for selectively redacting an image, the method comprising:
receiving image data, by one or more computer processors;
detecting, by the one or more computer processors, a portion of the image data relevant to an analysis, the portion comprising a set of attributes;
generating, by the one or more computer processors, a synthetic portion from the portion, wherein the synthetic portion retains at least some of the set of attributes of the portion;
detecting, by the one or more computer processors, a set of portions;
for each portion of the set of portions:
   generating, by the one or more computer processors, an avatar for the portion;
   applying, by the one or more computer processors, an overlay to each of the avatar and the portion, the overlay comprising a plurality of cells;
   replacing, by the one or more computer processors, cells of the portion with cells of the avatar according to a transform, yielding a set of synthetic portions, each synthetic portion of the set of synthetic portions associated with one transform of a set of transforms;
   analyzing, by the one or more computer processors, the set of synthetic portions using a machine learning model;
   analyzing, by the one or more computer processors, the set of portions using the machine learning model;
   determining, by the one or more computer processors, an accuracy according to the analysis of the set of synthetic portions and the analysis of the set of portions;
   selecting, by the one or more computer processors, a transform from the set of transforms according to the accuracy; and
   utilizing, by the one or more computer processors, the transform to generate synthetic portions from portions;
   replacing, by the one or more computer processors, the portion with the synthetic portion, yielding redacted image data; and providing, by the one or more computer processors, the redacted image data for the analysis.

2. The computer implemented method according to claim 1, further comprising:
analyzing, by the one or more computer processors, the redacted image data using a machine learning model.

3. The computer implemented method according to claim 1, wherein the image data comprises video data.

4. The computer implemented method according to claim 1, further comprising:
generating, by the one or more computer processors, an avatar for the portion;
applying, by the one or more computer processors, an overlay to each of the avatar and the portion, the overlay comprising a plurality of cells; and
replacing, by the one or more computer processors, cells of the portion with cells of the avatar, yielding the synthetic portion.

5. The computer implemented method according to claim 4, further comprising:
detecting, by the one or more computer processors, at least some of the set of attributes of the portion; and
adjusting, by the one or more computer processors, the avatar according to at least some of the detected set of attributes.

6. A computer program product for selectively redacting an image, the computer program product comprising one or more computer readable storage devices and collectively stored program instructions on the one or more computer readable storage devices, the stored program instructions comprising:
program instructions to receive image data;
program instructions to detect a portion of the image data relevant to an analysis, the portion comprising a set of attributes;
program instructions to detect a set of portions;
for each portion of the set of portions:
program instructions to generate an avatar for the portion;
program instructions to apply an overlay to each of the avatar and the portion, the overlay comprising a plurality of cells;
program instructions to replace cells of the portion with cells of the avatar according to a transform, yielding a set of synthetic portions, each synthetic portion of the set of synthetic portions associated with one transform of a set of transforms;
program instructions to analyze the set of synthetic portions using a machine learning model;
program instructions to analyze the set of portions using the machine learning model;
program instructions to determine an accuracy according to the analysis of the set of synthetic portions and the analysis of the set of portions;
program instructions to select a transform from the set of transforms according to the accuracy; and
program instructions to utilize the transform to generate synthetic portions from portions;
program instructions to generate a synthetic portion from the portion, wherein the synthetic portion retains at least some of the set of attributes of the portion;
program instructions to replace the portion with the synthetic portion, yielding redacted image data; and
program instructions to provide the redacted image data for the analysis.

7. The computer program product according to claim 6, further comprising:
program instructions to analyze the redacted image data using a machine learning model.

8. The computer program product according to claim 6, wherein the image data comprises video data.

9. The computer program product according to claim 6, further comprising:
program instructions to generate an avatar for the portion;
program instructions to apply an overlay to each of the avatar and portion, the overlay comprising a plurality of cells; and
program instructions to replace cells of the portion with cells of the avatar, yielding the synthetic portion.

10. The computer program product according to claim 9, further comprising:
program instructions to detect at least some of the set of attributes of the portion; and
program instructions to adjust the avatar according to at least some of the detected set of attributes.

11. A computer system for selectively redacting an image, the computer system comprising:
one or more computer processors;
one or more computer readable storage devices; and
stored program instructions on the one or more computer readable storage devices for execution by the one or more computer processors, the stored program instructions comprising:
program instructions to receive image data;
program instructions to detect a portion of the image data relevant to an analysis, the portion comprising a set of attributes;
program instructions to detect a set of portions;
for each portion of the set of portions:
program instructions to generate an avatar for the portion;
program instructions to apply an overlay to each of the avatar and the portion, the overlay comprising a plurality of cells;
program instructions to replace cells of the portion with cells of the avatar according to a transform, yielding a set of synthetic portions, each synthetic portion of the set of synthetic portions associated with one transform of a set of transforms;
program instructions to analyze the set of synthetic portions using a machine learning model;
program instructions to analyze the set of portions using the machine learning model;
program instructions to determine an accuracy according to the analysis of the set of synthetic portions and the analysis of the set of portions;
program instructions to select a transform from the set of transforms according to the accuracy; and
program instructions to utilize the transform to generate synthetic portions from portions;
program instructions to generate a synthetic portion from the portion, wherein the synthetic portion retains at least some of the set of attributes of the portion;
program instructions to replace the portion with the synthetic portion, yielding redacted image data; and
program instructions to provide the redacted image data for the analysis.

12. The computer system according to claim 11, further comprising:
program instructions to analyze the redacted image data using a machine learning model.

13. The computer system according to claim 11, wherein the image data comprises video data.

14. The computer system according to claim 11, further comprising:
program instructions to generate an avatar for the portion;
program instructions to apply an overlay to each of the avatar and portion, the overlay comprising a plurality of cells; and
program instructions to replace cells of the portion with cells of the avatar, yielding the synthetic portion.

15. The computer system according to claim 14, further comprising:
program instructions to detect at least some of the set of attributes of the portion; and
program instructions to adjust the avatar according to at least some of the detected set of attributes.

16. A computer implemented method for selective redaction of image data, the method comprising:
determining, by one or more computer processors, at least one image data transform yielding a synthetic image portion from an underlying image portion, the synthetic image portion sufficient for image data portion detection by a machine learning model, and insufficient for image data portion identification;
detecting, by the one or more computer processors, an underlying image data portion in image data;
applying, by the one or more computer processors, the at least one transform to the underlying image data portion, yielding a synthetic image portion;
replacing, by the one or more computer processors, the underlying image portion with the synthetic image portion, yielding redacted image data; and
providing, by the one or more computer processors, the redacted image data to the machine learning model;
wherein determining the at least one image data transform comprises selecting an image data transform according to a machine learning model accuracy.

17. The computer implemented method according to claim 16 further comprising:
generating, by the one or more computer processors, an avatar for the underlying image data portion; and
applying, by the one or more computer processors, the at least one transform to the underlying image data portion and the avatar, replacing data of the underlying image data portion with data of the avatar, yielding the synthetic image portion.

18. The computer implemented method according to claim 16, wherein the image data comprises video data.

19. A method for selectively redacting of image data, the method comprising:
determining a set of image data attributes associated with a machine learning model, wherein the set of image data attributes is sufficient for data portion detection by the machine learning model;
detecting, by the one or more computer processors, a set of portions;
for each portion of the set of portions:
generating, by the one or more computer processors, an avatar for the portion;
applying, by the one or more computer processors, an overlay to each of the avatar and the portion, the overlay comprising a plurality of cells;
replacing, by the one or more computer processors, cells of the portion with cells of the avatar according to a transform, yielding a set of synthetic portions, each synthetic portion of the set of synthetic portions associated with one transform of a set of transforms;
analyzing, by the one or more computer processors, the set of synthetic portions using a machine learning model;
analyzing, by the one or more computer processors, the set of portions using the machine learning model;
determining, by the one or more computer processors, an accuracy according to the analysis of the set of synthetic portions and the analysis of the set of portions;
selecting, by the one or more computer processors, a transform from the set of transforms according to the accuracy; and
utilizing, by the one or more computer processors, the transform to generate synthetic portions from portions;
selectively redacting image data according to the set of image attributes, yielding redacted image data; and
providing the redacted image data to the machine learning model.

20. The method according to claim 19, wherein the image data comprises video data.

* * * * *